United States Patent
Monk et al.

(10) Patent No.: US 12,339,434 B2
(45) Date of Patent: Jun. 24, 2025

(54) COMPACT MICROSCOPE STAGE

(71) Applicant: IOLIGHT LIMITED, Hampshire (GB)

(72) Inventors: Andrew Monk, Hampshire (GB); Richard Williams, Romsey (GB)

(73) Assignee: IOLIGHT LIMITED (GB)

( * ) Notice: Subject to any disclaimer, the term of this patent is extended or adjusted under 35 U.S.C. 154(b) by 519 days.

(21) Appl. No.: 17/792,475

(22) PCT Filed: Dec. 23, 2020

(86) PCT No.: PCT/GB2020/053360
§ 371 (c)(1),
(2) Date: Jul. 13, 2022

(87) PCT Pub. No.: WO2021/148767
PCT Pub. Date: Jul. 29, 2021

(65) Prior Publication Data
US 2023/0048374 A1     Feb. 16, 2023

(30) Foreign Application Priority Data
Jan. 20, 2020   (GB) ...................... 2000802

(51) Int. Cl.
*G02B 21/26*     (2006.01)
*G02B 21/06*     (2006.01)

(52) U.S. Cl.
CPC .............. *G02B 21/26* (2013.01); *G02B 21/06* (2013.01)

(58) Field of Classification Search
CPC .... G02B 21/26; G02B 21/06; G02B 21/0092; G02B 21/24
See application file for complete search history.

(56) References Cited

U.S. PATENT DOCUMENTS

| | | | |
|---|---|---|---|
| 4,113,223 A | 9/1978 | Kakizaki | |
| 6,847,481 B1 * | 1/2005 | Ludl | G01N 35/04 359/368 |
| 2012/0133756 A1 * | 5/2012 | Levin | G02B 21/12 348/79 |
| 2017/0160534 A1 * | 6/2017 | Fan | G02B 21/361 |

FOREIGN PATENT DOCUMENTS

| | | | | |
|---|---|---|---|---|
| EP | 3257621 A1 | * 12/2017 | .......... | B23Q 1/4861 |
| GB | 2524488 A | 9/2015 | | |
| JP | H09152556 A | * 6/1997 | | |
| JP | 2014197108 A | * 10/2014 | ............. | G02B 21/00 |

OTHER PUBLICATIONS

The International Bureau of WIPO—International Preliminary Report on Patentability—International Application No. PCT/GB2020/053360—Dated Aug. 4, 2022.

* cited by examiner

*Primary Examiner* — Jia X Pan
(74) *Attorney, Agent, or Firm* — Luedeka Neely, P.C.

(57) ABSTRACT

A microscope stage comprising a planar base (1) with two or more parallel grooves (2) formed extending in a first direction (5). A carriage (3) is mounted on the base with at least two projections (4) that slide in the grooves. The carriage receives a microscope slide or other sample holder (6). The carriage includes at least one guide and a biasing means (7) to urge the sample holder against the guide while permitting it to move relative to the guide in a second direction (8) orthogonal to the first direction.

19 Claims, 5 Drawing Sheets

Figure 10
Fig 10a
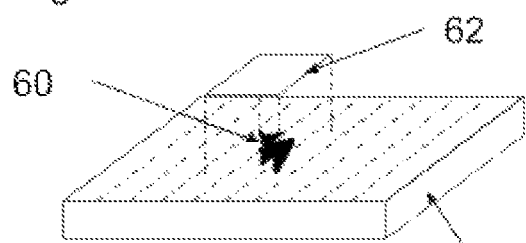
Fig 10b
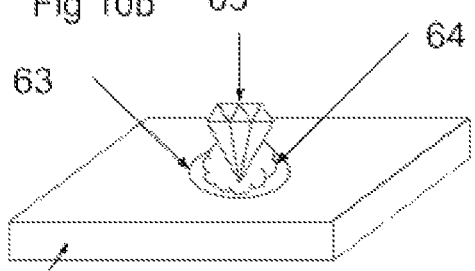
Fig 10c
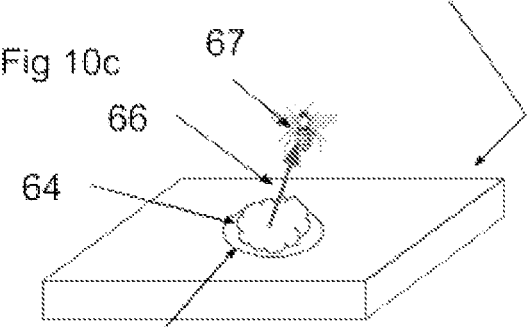
Fig 10d
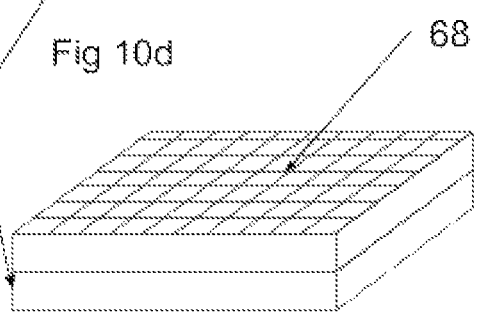
Fig 10e
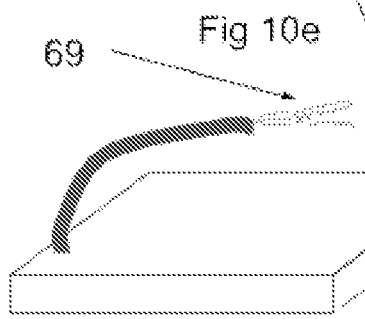

COMPACT MICROSCOPE STAGE

This invention relates to a stage for compact portable microscopes.

The stage is an important part of high-resolution microscopes. It sits in front of the objective lens and has the function of holding the subject very still relative to the optical system so that it may be clearly viewed at a high resolution. A precision laboratory microscope stage also moves the sample smoothly in orthogonal X and Y directions to view any part of the subject required by the user.

GB2524488 describes a compact microscope designed to fit in a jacket pocket. To do this the instrument folds flat, making it highly portable. This microscope does not include the smoothly positionable, precision stage seen on laboratory microscopes because it would be too large to fit in a pocket and susceptible to contamination in the field from animal faeces, plant debris, water and biochemical stains. It would also be difficult to manufacture in volume with a low cost. GB2524488 does include a compact miniaturised version of the precision laboratory microscope stage. However, the small precision parts required are fragile, expensive and susceptible to contamination in the field and this stage is not generally used. Designing an XY stage that is thin, compact, accurate, inexpensive and robust is difficult, but without such an XY stage, the application of portable microscopes is limited.

The present invention provides a microscope stage comprising a base defining a planar surface, at least two parallel grooves formed in the planar surface and extending in a first direction, a carriage mountable on the base, the carriage comprising at least two projections on the underside wherein at least one projection is slideably receivable in each groove in the planar surface whereby the carriage is movable relative to the base in the first direction, the carriage defining a receiver configured to receive a sample holder, the receiver defining at least one guide, a biasing means configured to bias a sample holder against the guide while permitting movement of the sample holder relative to the guide in a second direction orthogonal to the first direction.

Further advantageous features are set out in the dependant claims.

The invention will now be described solely by way of example and with reference to the accompanying drawings in which.

FIGS. 4a and b show vertical sections through two further embodiments of the invention.

FIGS. 5a and b show operation of the stage with the integrated illumination systems of the microscope.

Figure 6:
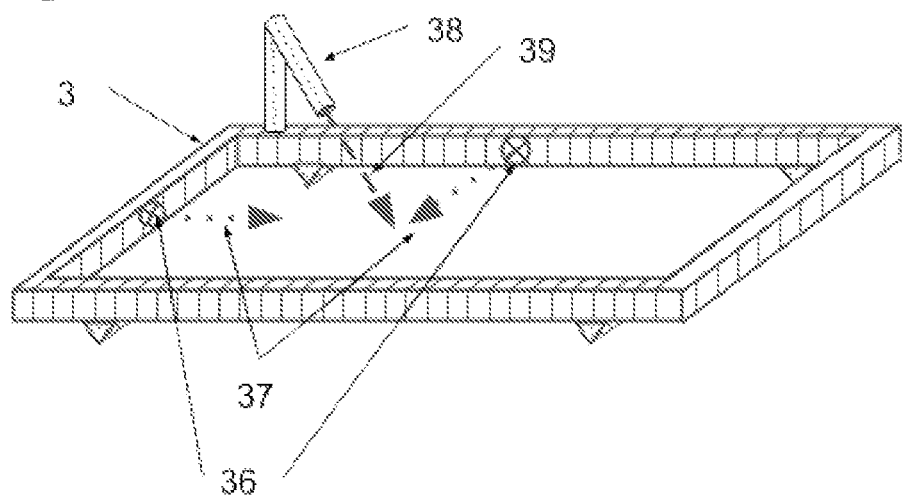
Figure 7:
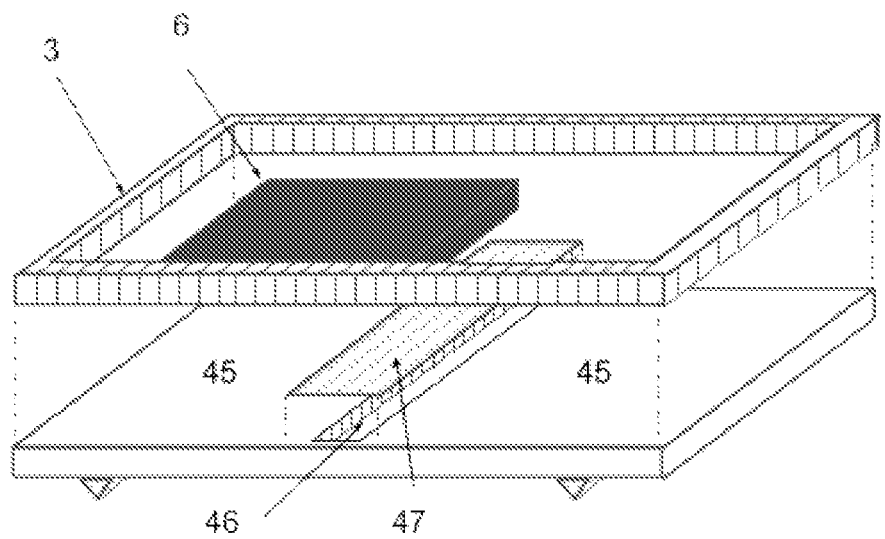

FIG. 6 shows how additional illumination schemes may be integrated into the stage FIG. 7 shows an embodiment of the present invention with the addition of an optical filter below the sample.

Figure 8:
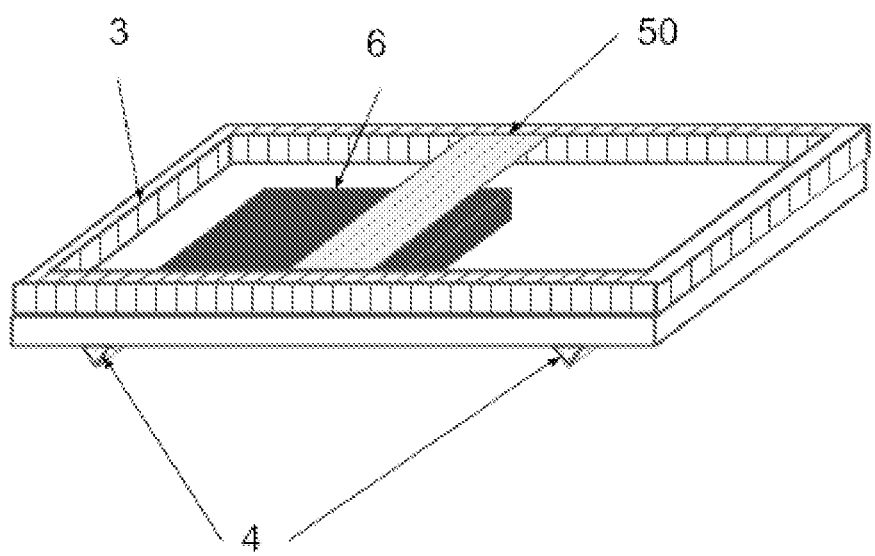

FIG. 8 shows an embodiment of the present invention with the addition of an optical filter above the sample.

Figure 9:
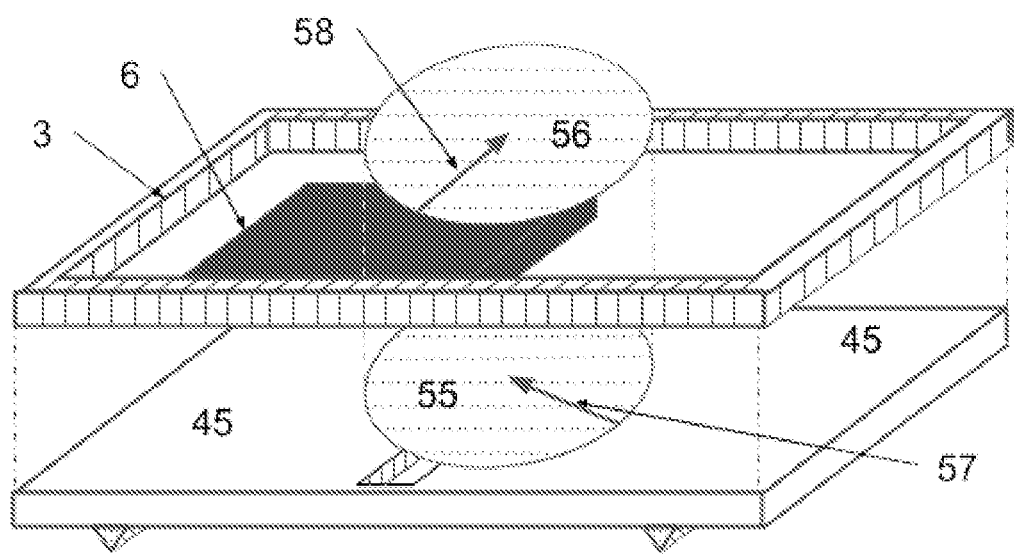

FIG. 9 shows an embodiment of the present invention with the addition of rotatable polarisation filters above and below the sample.

FIG. 10 a to e show five examples of the sample carrier.

The preferred embodiment of the invention is intended for use with a portable microscope such as that described in patent application GB2524488. The upper surface of the base of the microscope has two or more parallel grooves cut into it. In the preferred embodiment, the grooves are V-shaped, with rounded or sharp points; trapezoidal or any other shape that is wider at the top than at the bottom. A carriage is placed on the base such that projections from the underside of the carriage closely fit into the grooves allowing it to move smoothly backwards and forwards in a direction defined by the grooves. The close fit of the projections into the grooves prevents the carriage from travelling in any other direction.

The carriage features an aperture with a flat side that is substantially orthogonal to the grooves in the base. The preferred embodiment of the aperture is somewhat larger than a typical 75 mm×25 mm microscope slide such that a microscope slide can be placed into the aperture parallel to the plane of the microscope base. Other sample carriers or counting chambers may be placed into the aperture instead of a microscope slide, as required by the application.

The carriage also features a spring plunger that urges the sample carrier snugly against the flat side of the carriage aperture orthogonal to the grooves. In this way, the long axis of the sample carrier is always held perpendicular to the grooves as the carriage travels along the grooves. The spring plunger may be replaced by multiple spring plungers, one or more leaf springs or any other mechanism to urge the slide against a side of the aperture that is orthogonal to the grooves in the base. The microscope slide may be pushed manually along the long side of the carriage aperture in either direction, always being held perpendicular to the grooves. The slide is firmly held in the carriage such that it cannot move in any other direction. The invention therefore allows the slide to be pushed along the stage in either the X or the Y direction, perpendicular to or parallel to the grooves to facilitate counting of cells or other small subjects on a microscope slide.

In the preferred embodiment of the present invention, the carriage is held firmly onto the microscope base using magnets. In this embodiment, the microscope base contains magnetic material. This ensures that the carriage stays engaged with the grooves, but can be removed easily for compact storage and cleaning of the carriage and the grooves.

In the preferred embodiment of the present invention, the parallel grooves on the base and corresponding projections on the carriage are V-shaped or trapezoidal. Standard milling machines can cut these shaped grooves parallel to very tight angular tolerance at a low cost.

Fabricating the distance between the grooves and the depth of the grooves with similar precision is more difficult and more expensive. The V-Shaped or trapezoidal grooves are preferred because any imprecision in the depth of the grooves or the distance between them will not affect the smooth operation of this bearing. The smooth operation of the bearing with V-Shaped or trapezoidal grooves relies solely on the grooves and the projections being precisely parallel. The present invention, therefore, relies on a low-cost fabrication process, that is machining precisely parallel grooves. It is not dependent on the expensive high accuracy fabrication of the separation and depth of the grooves.

The present invention may be fabricated using any other groove cross-section. Preferably both the grooves on the base and the projections on the carriage should increase smoothly in width being narrow at the bottom and wide at the top.

The balance between the surface finish on the grooves and carriage and the strength of the magnets is important. In the preferred embodiment, these are selected to ensure a smooth slide, but to keep the stage still when required to give the highest microscope resolution. Preferred surfaces include finishes or materials such as hard anodised aluminium, polished or fine bead-blasted steel, bronze, acetal, dense nylon, PEEK or PTFE.

The replacement of one of the bearings with grooves and projections engineered in this way eliminates the need for one set of precision bearings without adding any height to the assembly. The second, orthogonal set of bearings is replaced by the microscope slide, sample carrier, or counting chamber moving smoothly along the straight edge of the aperture in the carriage, held in place by the spring. The combination of the grooves and carrier projections in one direction and the slide moving along the carrier aperture in the orthogonal direction forms a compact XY stage that is inexpensive to manufacture. It has no small parts that would be susceptible to dirt and is easily removed for cleaning. The proposed stage has a very low profile which could be as thin as a microscope slide and is easily portable.

The microscope can be used without the XY stage if required. The grooves do not interfere with the movement of the sample if the carriage is removed.

The preferred embodiment of the compact stage does not restrict the integrated illumination system of the microscope. Transmitted light from an illuminator below the compact stage passes through the sample carrier to an objective lens or sensor above. Similarly, incident light from an illuminator above the sample is reflected by the sample back up to an objective lens or sensor above. In the case of an inverted microscope, transmitted light from an illuminator above the sample passes through the slide carrier to an objective lens or sensor below the sample. Similarly incident light from an illuminator below the sample is reflected back down to an objective lens or sensor below the sample.

Figure 1:
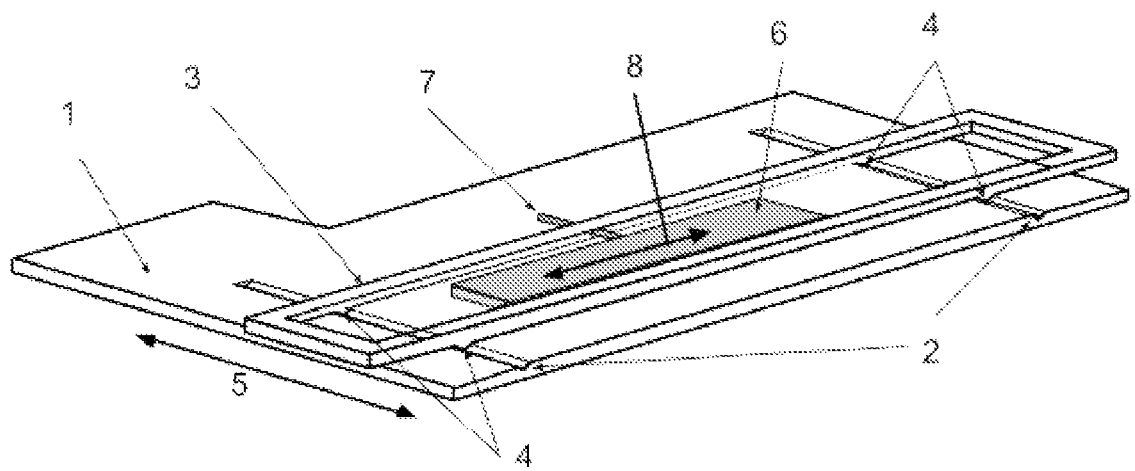
FIG. 1 shows a preferred embodiment of the microscope stage according to the invention, for mounting on the top surface of a compact microscope.

FIG. 1 shows the preferred embodiment of the microscope stage according to the present invention. The top surface 1 of the compact microscope has two or more parallel grooves 2 machined into it. The carriage 3 features projections 4, which are machined to fit the grooves 2 such that the carriage 3 slides smoothly in a direction 5 defined by the grooves 2. A sample carrier 6 fits into an aperture in the carriage 3. The sample carrier 6, may be a microscope slide, counting chamber, haemocytometer or any other carrier for the sample. The sample carrier 6 is urged against the long side of the aperture carriage 3 by a spring plunger 7, or similar force, such that it slides smoothly along the long side of the aperture in a direction 8 perpendicular to the grooves 2.

Figure 2:
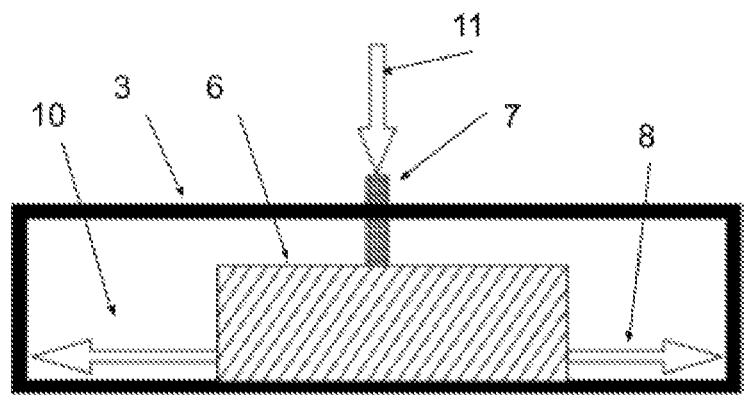
FIG. 2 shows a plan view of the carriage and sample carrier of FIG. 1

FIG. 2 shows a plan view of the preferred embodiment of the carriage 3 with an aperture 10. The sample carrier 6 is urged against the edge of the aperture 10 by a spring plunger 7 exerting a force in a direction 11 perpendicular to the axis of the carriage 3. The sample carrier 6 moves smoothly in a direction 8 along the axis of the carriage 3.

Figure 3:
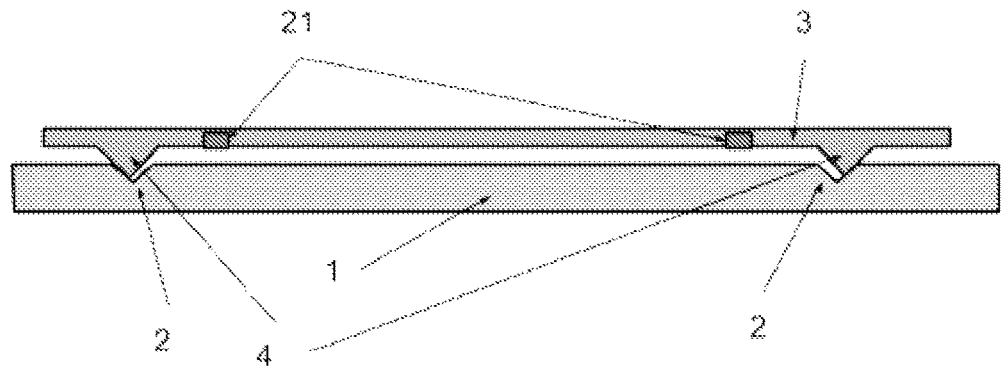
FIG. 3 shows a vertical section through the stage of FIG. 1.

FIG. 3 shows a vertical section through a preferred embodiment of the carriage 3 and the microscope base 1. The V-shaped projections 4 on the carriage 3 run in the V-Shaped grooves 2 in the microscope base 1. FIG. 3 shows a small manufacturing inaccuracy, in this case the projections 4 are slightly further apart than the grooves 2. This just causes the carriage 3 to be positioned slightly higher and the bearing still works well. In this embodiment the carriage 3 is held firmly onto the microscope base 1 by permanent magnets 21 embedded in the carriage 3. The magnets 21 act on the microscope base 1, which in this embodiment includes magnetic material.

Figure 4:
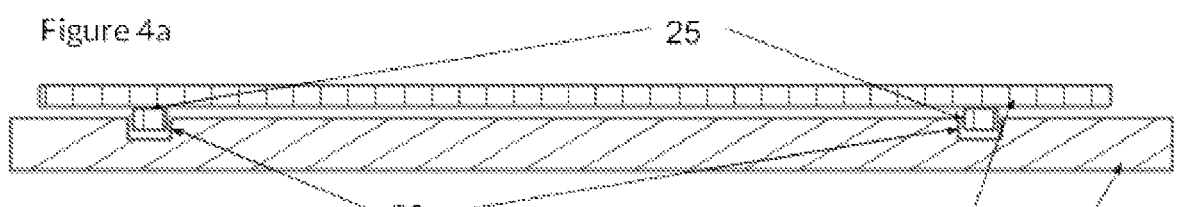
Figure 4:
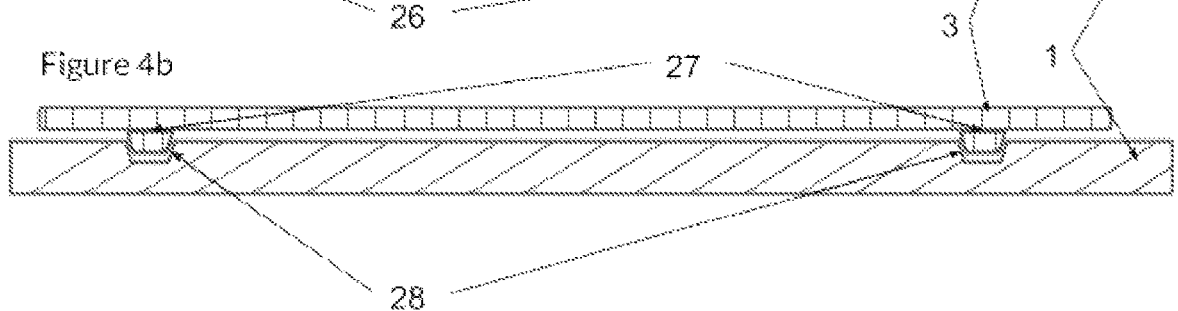

FIG. 4 shows vertical sections through two further embodiments of the carriage 3 and the microscope base 1. In the FIG. 4a, the grooves 26 and projections 25 are rectangular and in the FIG. 4b, the grooves 28 and projections 27 are trapezoidal.

Figure 5:
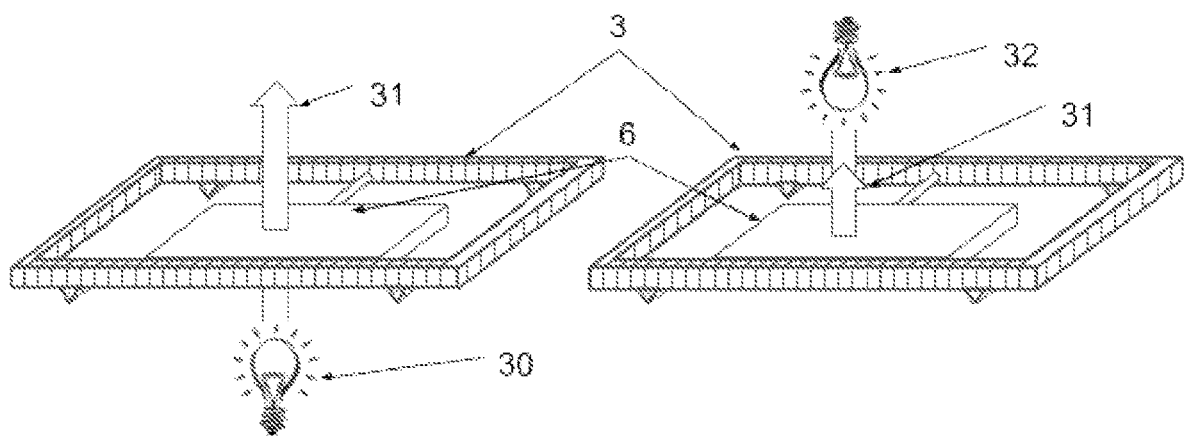

FIG. 5 shows two possible illumination schemes in the preferred embodiment of the current invention. Both of these schemes use the standard illumination provided by the compact microscope. In FIG. 5a, the carriage 3 is illuminated from a light source 30 below the sample. The light passes through the transparent sample carrier 6 and the sample and continues towards an objective lens or sensor 31 above the sample. This may be referred to as transmitted illumination. In FIG. 5b, the carriage 3 is illuminated from a light source 32 above the sample. The light is reflected by the sample carrier 6 and the sample and travels back towards an objective lens or sensor 31 above the sample and close to the light source 32. This may be referred to as incident illumination. It may be seen that the aperture in this embodiment of the carriage allows light from the microscope's standard illumination system to operate as it would without the compact microscope stage so no additional illumination is required.

FIG. 6 shows how additional illumination may be integrated into the carriage 3 by mounting one or more LEDs or other illuminators 36 in the walls of the carriage to provide side illumination 37 onto the subject. Similarly, one or more LEDs or other illuminators may be mounted on fixed or flexible stands 38 on the carriage allowing illumination 39 to be applied to the subject in a wide range of different directions. These lighting options are useful for thicker subjects, such as insects.

FIG. 7 is an exploded diagram of an embodiment of the present invention that includes an optical filter 47 below the sample carrier 6. In this embodiment the carriage comprises a top half 3 with an aperture as described above and a bottom half 45. These two halves are permanently joined to each other, but FIG. 7 is an exploded view to show the filter 47. The filter 47 can have several functions including filtering out certain wavelengths or polarising the light from the illuminator below. The bottom half of the carriage 45 includes an aperture 46 parallel to the grooves in the base so that the sample can be illuminated from below with the carriage in any position. The filter 47 may be mounted in a recess around the aperture 46 or a slot fabricated in the bottom half of the carriage 45 for the purpose, or in any other way. One or more selectable filters may be mounted on a disc or strip that moves relative to the bottom half of the carriage 45 to insert each selectable filter into the aperture 46 in turn. This feature allows the user to select the desired filter for each application.

FIG. 8 shows an embodiment of the present invention that includes a filter 50 above the sample carrier 6. The filter 50 is mounted on top of the carriage 3 between the projections 4 to filter the light travelling from the sample to the objective lens. It only needs to cover the centre portion of the carriage that can be viewed by the objective lens of the microscope. The filter 50 can have several functions including filtering out certain wavelengths or polarising the light from the sample.

FIG. 9 shows an exploded view of an embodiment of the carrier 3 and 45 with a first polarisation filter 55 mounted below the sample stage 6 and a second polarisation filter 56 mounted above the sample stage 6. The first polarisation filter has a first polarisation axis 57 and the second polarisation filter has a second polarisation axis 58. Either or both of the first polarisation filter 55 and the second polarisation filter 56 may be rotatable about an axis perpendicular to the base 45 of the carriage. With no sample present, light travels through both filters when the first polarisation axis 57 and the second polarisation axis 58 are parallel and light is blocked when the first polarisation axis 57 and the second polarisation axis 58 are perpendicular. This feature may be used to measure birefringence of a sample placed on the sample stage 6 by measuring the angle between the first polarisation axis 57 and the second polarisation axis 58 at which features in the sample become visible or disappear.

FIG. 10 shows five examples of the sample carrier 6.

In the first example in FIG. 10a, the sample carrier 6 is a normal microscope slide, such as the Fisher Scientific® Fisherbrand™ glass microscope slide. A sample 60 is placed on the microscope slide 6 and may be covered with a normal coverslip 62, such as the Fisher Scientific® Fisherbrand™ borosilicate glass square coverslip, following any method for viewing samples on a laboratory microscope. The sample carrier slide 6, sample 60 and coverslip 62 are then placed into the compact stage and positioned on the microscope according to the present invention.

The second example of the sample carrier 6 in FIG. 10b, has a cavity 63 that may be used to hold a sample. In this embodiment a mounting medium such as putty, Blu Tack®, cork or expanded polystyrene 64 may be placed in the cavity 63 to hold the sample 65. The sample carrier 6 is then placed into the compact stage and positioned on the microscope according to the present invention.

The third example in FIG. 10c, of the sample carrier 6 also features a cavity 63 and mounting medium 64 as described above. In this embodiment a pin 66 is pushed through the mounting medium creating a point on which a sample 67 may be mounted. The sample carrier 6 is then placed into the compact stage and positioned on the microscope according to the present invention. This example is particularly useful for thick samples such as insects.

The fourth example in FIG. 10d, of the sample carrier 6 includes a counting chamber 68. This can be filled with a liquid sample containing microscopic items for counting. Examples include eggs of Gastrointestinal Nematodes in a faecal sample for Worm Egg Counts or yeast cells in a beer sample. Standard commercially available counting chambers may be used, such as the Z11000 McMaster Egg Slide from Hawksley®, the AC2000 Neubauer from Hawksley® or the mini-FLOTAC® chambers. These chambers have grids printed, moulded or etched on a surface near to the samples so that the user can count the number of items per grid square and infer the number of items per gram or millilitre of sample. The sample carrier 6 is then placed into the compact stage and scanned on the microscope in X and Y directions according to the present invention.

The fifth example in FIG. 10e, of the sample carrier 6 features a positionable arm with a clip 69 to hold a range of samples. The sample carrier 6 is then placed into the compact stage and positioned on the microscope according to the present invention.

The invention claimed is:

1. A microscope comprising a base defining a planar surface, at least two parallel grooves formed in the planar surface and extending in a first direction, a carriage mountable on the base, the carriage comprising at least two projections on the underside wherein at least one projection is slidably receivable in each groove in the planar surface whereby the carriage is movable relative to the base in the first direction, the carriage defining a receiver configured to receive a sample holder, the receiver defining at least one guide, a biasing means configured to bias the sample holder against the guide while permitting movement of the sample holder relative to the guide in a second direction orthogonal to the first direction.

2. A microscope as claimed in claim 1, wherein the width of the grooves and of the projections is greatest at the top and decreases downwardly.

3. A microscope as claimed in claim 1, wherein the grooves are V-shaped with rounded or sharp points or trapezoidal in cross-section.

4. A microscope as claimed in claim 1, wherein the projections are V-shaped with rounded or sharp points or trapezoidal in cross-section.

5. A microscope as claimed claim 1, wherein the receiver comprises an aperture in the carriage.

6. A microscope as claimed in claim 5, wherein the guide comprises an edge of the aperture.

7. A microscope as claimed in claim 1, wherein the biasing means comprises at least one spring.

8. A microscope as claimed in claim 1, wherein the biasing means comprises at least one pusher member and a releasable catch.

9. A microscope as claimed in claim 1, further comprising retaining means to removably hold the carriage on the base while permitting movement of the carriage along the grooves.

10. A microscope as claimed in claim 9, wherein the retaining means comprises at least one magnet mounted either on the carriage or on the base, and the other of the carriage and the base comprises a magnetic material.

11. A microscope as claimed in claim 1, further comprising illumination means mounted on the carriage.

12. A microscope as claimed in claim 1, wherein the carriage is configured to carry one or more optical filters above, below, or both above and below the sample holder.

13. A microscope as claimed in claim 12, wherein the one or more optical filters are mounted on one or more filter carriers that are positionable to select the desired filter or filters.

14. A microscope as claimed in claim 1, wherein the carriage is configured to carry one or two optical filters mounted above, below, or both above and below the sample holder and the one or two optical filters are rotatable to select the optical axis of one or both of the one or two optical filters.

15. A microscope as claimed in claim 1, further comprising a powered drive means operable to move the carriage relative to the base in the first direction.

16. A microscope as claimed in claim 15, wherein the powered drive means comprises an electric motor.

17. A microscope as claimed in claim 1, further comprising a powered drive means operable to move the sample holder relative to the guide in the second direction.

18. A microscope as claimed in claim 17, wherein the powered drive means comprises an electric motor.

19. A microscope as claimed in claim 1, wherein the grooves in the base, or the projections on the carriage, or both, are formed with a surface coating to provide smooth relative movement between the projections and the grooves.

* * * * *